United States Patent
Lee et al.

(10) Patent No.: US 9,553,624 B2
(45) Date of Patent: Jan. 24, 2017

(54) CARD SOCKET DEVICE AND ELECTRONIC APPARATUS INCLUDING THE SAME

(71) Applicant: Samsung Electronics Co., Ltd., Suwon-si (KR)

(72) Inventors: Jae-bum Lee, Yongin-si (KR); Ki-sun Kim, Seoul (KR); Jong-rak Sohn, Hwaseong-si (KR); Seok-chan Lee, Hwaseong-si (KR); Dong-min Kim, Hwaseong-si (KR); Ju-seok Lee, Seoul (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/827,244

(22) Filed: Aug. 14, 2015

(65) Prior Publication Data
US 2016/0049977 A1    Feb. 18, 2016

(30) Foreign Application Priority Data

Aug. 14, 2014  (KR) .................. 10-2014-0105711
Jul. 10, 2015  (KR) .................. 10-2015-0098411

(51) Int. Cl.
| | |
|---|---|
| G06K 19/077 | (2006.01) |
| H04B 1/3818 | (2015.01) |
| H01R 13/24 | (2006.01) |
| H01R 12/70 | (2011.01) |
| H01R 12/71 | (2011.01) |

(52) U.S. Cl.
CPC ....... *H04B 1/3818* (2015.01); *G06K 19/07741* (2013.01); *G06K 19/07745* (2013.01); *H01R 13/2442* (2013.01); *H01R 12/7005* (2013.01); *H01R 12/7076* (2013.01); *H01R 12/714* (2013.01)

(58) Field of Classification Search
CPC  G06F 1/1656; G06K 19/07741; H04B 1/3818
USPC ............... 455/556.1, 556.2, 558, 575.1, 90.3
See application file for complete search history.

(56) References Cited

U.S. PATENT DOCUMENTS

| | | | |
|---|---|---|---|
| 6,561,431 B2* | 5/2003 | Roussy | ................... G06K 13/08 235/486 |
| 6,663,007 B1* | 12/2003 | Sun | ....................... G06K 7/0043 235/441 |
| 7,217,148 B1 | 5/2007 | Chen | |
| 7,335,044 B2 | 2/2008 | Lai | |
| 7,390,204 B2 | 6/2008 | Tanaka et al. | |
| 7,470,136 B2 | 12/2008 | Yahiro et al. | |
| 7,486,523 B2 | 2/2009 | Wu et al. | |
| 7,494,360 B2 | 2/2009 | Zhan et al. | |
| 7,682,179 B1 | 3/2010 | Tsai | |
| 7,762,827 B2* | 7/2010 | Liu | ....................... H01R 13/639 439/331 |

(Continued)

*Primary Examiner* — John J Lee
(74) *Attorney, Agent, or Firm* — Muir Patent Law, PLLC

(57) ABSTRACT

Disclosed are a card socket device and an electronic apparatus including the same. The card socket device includes a seat portion configured to receive an attachable card; and one or more connection terminal portions formed in the seat portion and configured to form an electrical connection with one or more connection pads formed in a bottom surface of the attachable card, wherein the seat portion is configured such that a space accommodating the attachable card is upwardly opened.

19 Claims, 14 Drawing Sheets

(56) References Cited

U.S. PATENT DOCUMENTS

| | | | |
|---|---|---|---|
| 7,762,850 B2 | 7/2010 | Tang | |
| 7,794,258 B2* | 9/2010 | Tu | H01R 13/6272 439/326 |
| 8,083,534 B2 | 12/2011 | Pipho et al. | |
| 2009/0017687 A1* | 1/2009 | Harris | G06K 7/0021 439/630 |
| 2015/0248365 A1* | 9/2015 | Cheng | G06K 7/0043 710/301 |

* cited by examiner

CARD SOCKET DEVICE AND ELECTRONIC APPARATUS INCLUDING THE SAME

CROSS-REFERENCE TO RELATED APPLICATIONS

This application claims the benefit of priority under 35 U.S.C. §119 of Korean Patent Application No. 10-2014-0105711, filed Aug. 14, 2014, and Korean Patent Application No. 10-2015-0098411, filed Jul. 10, 2015, in the Korean Intellectual Property Office, the disclosures of which are incorporated herein by reference in their entireties.

BACKGROUND

The disclosed embodiments relate to a card socket device and an electronic apparatus including the same, and more particularly, to a card socket device and an electronic apparatus including the same, which may provide improved insertion of an attachable card.

An electronic apparatus may be equipped with various types of attachable cards. For example, a mobile wireless terminal may be equipped with a subscriber identity module (SIM) card or a memory card as an auxiliary memory device that may be connected in a detachable manner.

An attachable card, such as the SIM card or the memory card, may be mounted on a card socket device which is separately provided in the electronic apparatus. The card socket device may include several components to fix or separate the attachable card to or from the card socket device. An increase in the number of components may involve an increase in size or weight of the electronic apparatus, an increase in the number of assembly processes, an increase in costs due to the greater number of components, or the like.

SUMMARY

In some exemplary embodiments, the present disclosure is directed to a card socket device comprising: a seat portion configured to receive an attachable card; and one or more connection terminal portions formed in the seat portion and configured to form an electrical connection with one or more connection pads formed in a bottom surface of the attachable card, wherein the seat portion is configured such that a space accommodating the attachable card is upwardly opened.

In some embodiments, the present disclosure may further include wherein the seat portion includes a bottom portion which faces the bottom surface of the attachable card and on which the one or more connection terminal portions are formed, and one or more sidewall portions that face at least a portion of a side of the attachable card wherein an inner surface of the one or more sidewall portions has a shape corresponding to the side of the attachable card so as to be engaged with the side of the attachable card, and wherein an inner surface of the one or more sidewall portions has a shape corresponding to the side of the attachable card so as to be engaged with the side of the attachable card In some embodiments, the present disclosure may further include one or more fixing members disposed in an upper inner surface of the one or more sidewall portions to retain the attachable card.

In some embodiments, the present disclosure may further include a visor configured to protrude from an upper inner surface of a portion of the one or more sidewall portions, which are adjacent to the connection terminal portions, and to direct the attachable card to be inserted in a direction toward the connection terminal portion.

In some embodiments, the present disclosure may further include wherein when the attachable card is mounted on the seat portion, a height of a top surface of the sidewall portion is equal to or lower than a height of a top surface of the attachable card.

In some embodiments, the present disclosure may further include wherein the seat portion has a planar shape.

In some embodiments, the present disclosure may further include wherein the one or more connection terminal portions include a first connection terminal and a second connection terminal, and a height of a top surface of the first connection terminal is higher than a height of a top surface of the second connection terminal.

In some embodiments, the present disclosure may further include wherein the first connection terminal is a power supply terminal, and the second connection terminal is a data input/output terminal.

In some embodiments, the present disclosure may further include wherein the one or more connection terminal portions include a flexible member having elasticity in a direction perpendicular to a bottom surface of the seat portion.

In some embodiments, the present disclosure may further include wherein when the attachable card is mounted, an area in which the seat portion overlaps the attachable card is smaller than half an area of the attachable card.

In some embodiments, the present disclosure may further include wherein the attachable card is one of a subscriber identity module (SIM) card, a user identity module (UIM) card, and a memory card.

In some exemplary embodiments, the present disclosure is directed to a card socket device comprising: a seat portion configured to receive an attachable memory card, wherein the seat portion is configured such that a space accommodating the attachable memory card is open on two linear sides; and one or more connection terminal portions formed in the seat portion and configured to form an electrical connection with one or more connection pads formed in a bottom surface of the attachable memory card, wherein the one or more connection terminal portions include a first connection terminal and a second connection terminal, and a height of a top surface of the first connection terminal is higher than a height of a top surface of the second connection terminal.

In some exemplary embodiments, the present disclosure is directed to an electronic apparatus, comprising: a card socket device configured to receive an attachable card; and an accommodating groove configured to accommodate the attachable card and the card socket device, wherein the card socket device is configured such that a space accommodating the attachable card is upwardly opened, and at least a portion of an inner surface of the first accommodating groove has a shape corresponding to a sidewall of the attachable card so as to be engaged with the sidewall of the attachable card.

In some embodiments, the present disclosure may further include a second accommodating groove disposed under an end of the attachable card and having a bottom surface lower than a bottom surface of the first accommodating groove when the attachable care is inserted into the card socket device.

In some embodiments, the present disclosure may further include wherein the card socket device is configured to expose a top surface of the attachable card when the attachable card is mounted thereon and further including: a fixing member disposed in an upper portion of an inner surface of the first accommodating groove to retain the attachable card.

In some embodiments, the present disclosure may further include a seat portion configured to receive an attachable card; and one or more connection terminal portions formed in the seat portion and configured to form an electrical connection with one or more connection pads formed in a bottom surface of the attachable card, wherein the seat portion is configured such that a space accommodating the attachable card is upwardly opened.

In some embodiments, the present disclosure may further include wherein the seat portion includes a bottom portion which faces the bottom surface of the attachable card and on which the one or more connection terminal portions are formed, and one or more sidewall portions that face at least a portion of a side of the attachable card, and wherein an inner surface of the one or more sidewall portions has a shape corresponding to the side of the attachable card so as to be engaged with the side of the attachable card.

In some embodiments, the present disclosure may further include one or more fixing members disposed in an upper inner surface of the one or more sidewall portions to retain the attachable card.

In some embodiments, the present disclosure may further include a visor configured to protrude from an upper inner surface of a portion of the one or more sidewall portions, which are adjacent to the one or more connection terminal portions, and to direct the attachable card to be inserted in a direction toward the connection terminal portion.

In some embodiments, the present disclosure may further include wherein when the attachable card is mounted on the seat portion, a height of a top surface of the sidewall portion is equal to or lower than a height of a top surface of the attachable card.

BRIEF DESCRIPTION OF THE DRAWINGS

Exemplary embodiments will be more clearly understood from the following detailed description taken in conjunction with the accompanying drawings in which.

DETAILED DESCRIPTION

Figure 1:
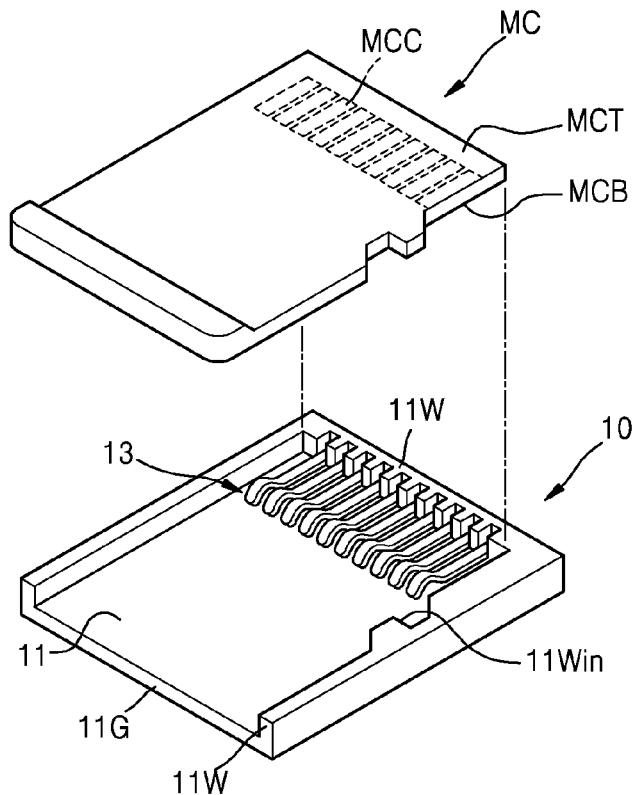
FIG. 1 is a perspective view of a card socket device, according to certain exemplary embodiments.

The disclosed embodiments will now be described more fully with reference to the accompanying drawings, in which exemplary embodiments are shown. The inventive concept and features, however, may be embodied in many different forms and should not be construed as being limited to the exemplary embodiments set forth herein. In the drawings, the thicknesses of layers and regions may be exaggerated for clarity. Like reference numerals in the drawings denote like elements.

It will be understood that, although the terms "first", "second", "third", etc. may be used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a first element, component, region, layer or section discussed below could be termed a second element, component, region, layer or section without departing from the teachings of the disclosed embodiments. For example, a first element may be referred to as a second element, and similarly, a second element may be referred to as a first element without departing from the scope of protection of the disclosure. In addition, in certain cases, even if a term is not described using "first," "second," etc. in the specification, it may still be referred to as "first" or "second" in a claim in order to distinguish difference claimed elements from each other.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise.

Embodiments described herein will be described referring to plan views and/or cross-sectional views by way of ideal schematic views. Accordingly, the exemplary views may be modified depending on manufacturing technologies and/or tolerances. Therefore, the disclosed embodiments are not limited to those shown in the views, but include modifications in configuration formed on the basis of manufacturing processes. Therefore, regions exemplified in figures may have schematic properties, and shapes of regions shown in figures may exemplify specific shapes of regions of elements to which aspects of the invention are not limited.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning.

As used herein, items described as being "electrically connected" are configured such that an electrical signal can be passed from one item to the other. Therefore, a passive electrically conductive component (e.g., wires, pads, internal electrical lines, etc.) physically connected to a passive electrically insulative component (e.g., a prepreg layer of a printed circuit board, an electrically insulative adhesive connecting two devices, an electrically insulative underfill or mold layer, etc.) is not electrically connected to that component. Moreover, items that are "directly electrically connected" to each other may be electrically connected through one or more passive elements, such as, for example, wires, pads, internal electrical lines, through vias, etc. As such, directly electrically connected components do not include components electrically connected through active elements, such as, for example, transistors or diodes.

As used herein, a semiconductor device may refer, for example, to a device such as a semiconductor chip (e.g., memory chip and/or logic chip formed on a die), a stack of semiconductor chips, a semiconductor package including one or more semiconductor chips stacked on a package substrate, or a package-on-package device including a plurality of packages. These devices may be formed using ball grid arrays, wire bonding, through substrate vias, or other electrical connection elements, and may include memory devices such as volatile or non-volatile memory devices. As used herein, the terms memory device may refer to a semiconductor device that includes one or more memory arrays, and/or may also refer to a device such as a memory card, memory module, or solid state drive that includes one or more memory chips or package. The use of the terms "device" or "card" is not intended to limit the types of memory.

An electronic device, as used herein, may refer to these semiconductor devices or memory devices, but may additionally include products that include these devices, such as a hard drive including additional components, or a mobile phone, laptop, tablet, desktop, camera or other consumer electronic device, etc.

Unless otherwise defined, all terms used herein, including technical and scientific terms, have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When embodiments may be implemented differently than that disclosed herein, a specific process order may also be performed differently from the described order. For example, unless the context indicates otherwise, two operations or processes described as being performed consecutively instead may be performed substantially at the same time or performed in an order opposite to the described order.

In the accompanying drawings, variations of the illustrated shapes may be expected as a result of, for example, manufacturing technologies and/or tolerances. Therefore, the exemplary embodiments should not be construed as being limited to specific shapes of the regions, as illustrated herein, but are to include deviations in shape that may result, for example, from manufacturing. As used herein, the term "and" and "or" include any and all combinations of one or more of the associated listed. Expressions such as "at least one of," when preceding a list of elements, modify the entire list of elements and do not modify the individual elements of the list.

Figure 2A:
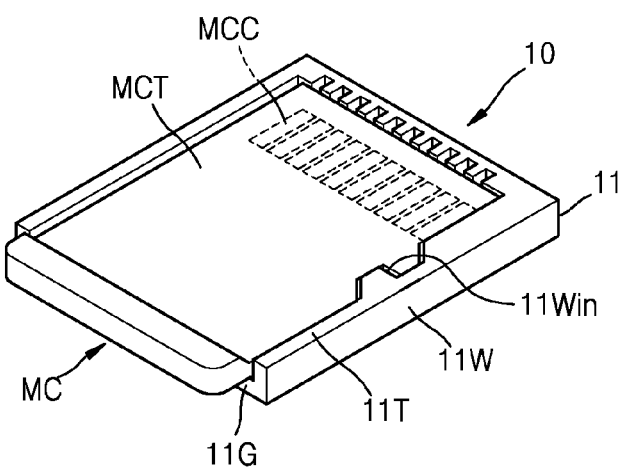
FIGS. 2A, 2B, and 2C are respectively a perspective view, a plan view, and a cross-sectional view of the card socket device of certain exemplary embodiments, such as the embodiments of FIG. 1, into which an attachable card is inserted.
Figure 2B:
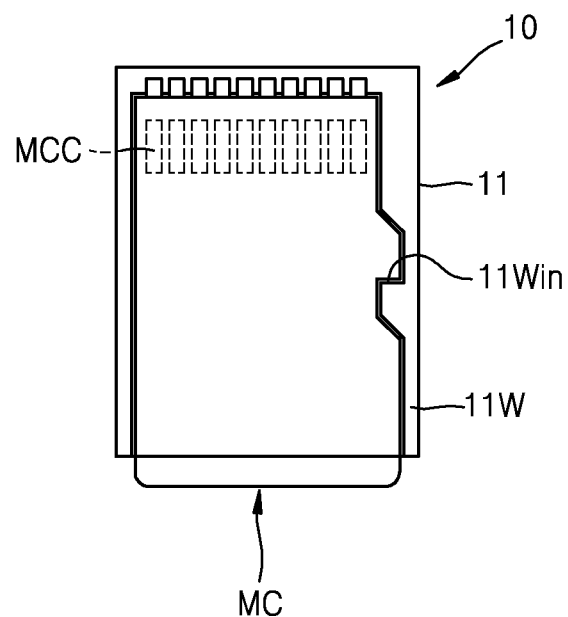
Figure 2C:
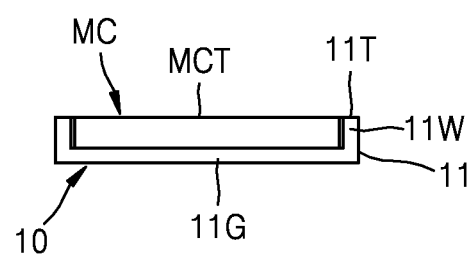

FIG. 1 is a perspective view of a card socket device 10 according to certain exemplary embodiments. FIGS. 2A, 2B, and 2C are, respectively, a perspective view, a plan view, and a cross-sectional view of the exemplary card socket device 10 of FIG. 1 into which an attachable card MC may be inserted.

Referring to FIG. 1, in some embodiments, the card socket device 10 may include a seat portion 11 into which the attachable card MC (e.g., memory card) may be inserted, and one or more connection terminal portions 13 formed on the seat portion 11. In certain embodiments, the seat portion 11 may be configured to expose a top surface MCT of the attachable card MC. For example, the seat portion 11 may be configured such that a space accommodating the attachable card MC is open at a top or upward facing space.

In some embodiments, the attachable card MC may be directly inserted into the card socket device 10 downwardly through an upper opened space of the card socket device 10.

For example, the seat portion 11 may include a bottom portion 11G and multiple sidewall portions 11W. In some embodiments, at least two of the sidewall portions 11W may be parallel and facing one another. The bottom portion 11G may face the bottom surface MCB of the attachable card MC.

The sidewall portions 11W may be formed along the interior edges or interior sides of the bottom portion 11G, such that the sidewall portions 11W face or abut at least a portion of corresponding sides of the attachable card MC. In this case, the sidewall portions 11W may have a shape opened to expose one of four sides of the attachable card MC.

Referring to FIGS. 2A, 2B, and 2C, in some embodiments, an opened lateral space may be used when the attachable card MC is separated from the card socket device 10. When the attachable card MC is mounted on the card socket device 10, for example, an end of the attachable card MC may stick out through the opened lateral space and, in some embodiments, extend beyond the bottom portion 11G. A user may lift the end of the attachable card MC, which sticks out, and easily separate the attachable card MC from the card socket device 10. Separation of the attachable card MC will be described in further detail with reference to FIG. 10.

In certain embodiments, because the seat portion 11 may not have a lid portion that covers the top surface MCT of the attachable card MC, a height of the sidewall portions 11W may not be particularly limited. For example, a height of the sidewall portions 11W may be equal to or lower than a height of the top surface MCT of the attachable card MC. In certain embodiments, the height of the sidewall portions 11W may be such that the top surface 11T of the sidewall portions may be substantially even, or on the same level or plane, with the top surface MCT of the attachable card MC. In some exemplary embodiments, the card socket device 10 may have a planar shape including the bottom portion 11G without the sidewall portion 11W.

In some exemplary embodiments, when a fixing member is formed in an upper inner surface of the sidewall portions 11W, a height of the top surface 11T of the sidewall portion 11W may be higher than the height of the top surface MCT of the attachable card MC.

An inner surface 11Win of one or more of the sidewall portions 11W may have a shape corresponding to a side of the attachable card MC so as to be engaged with the side of the attachable card MC. The side of the attachable card MC may have a bended portion and the inner surface 11Win of the sidewall portion 11W may be formed to define the bended portion of the side of the attachable card MC. That is, a space defined by the sidewall portion 11W may correspond to a specific shape of the attachable card MC. Since an upper side of the seat portion 11 is opened, the user may visually check a shape of the space defined by the sidewall portion 11W.

Generally, in conventional systems, a card socket on which a card is mounted may have a drawer shape. The drawer-shaped card socket may be enclosed on five sides, e.g., a bottom, three sidewalls, and a top that is configured to cover the top surface of an inserted card. The card may be inserted by pushing the card through a narrow lateral space of the card socket. In such configurations, the user may insert the attachable card MC and not know a position of a connection terminal portion of the card socket or whether the card is compatible with the card socket. Therefore, when the card is improperly inserted into the card socket, there is a possibility that the card socket or the card may be damaged.

In some exemplary embodiments of the present disclosure, the card socket device 10 may allow the user to visually check or verify a shape of the space defined by the sidewall portions 11W. For example, the user may insert the attachable card MC into the space defined by the sidewall portions 11W, properly fitting the attachable card MC into the space. In addition, it may be possible for the user to determine whether a certain attachable card is compatible with the card socket device 10 by, for example, comparing the shape of the space defined by the sidewall portion 11W with a shape of a given attachable card MC. Therefore, it may be possible to prevent or inhibit damage to the attachable card MC or the card socket device 10, which may be caused due to the insertion of the attachable card which is incompatible with the card socket device 10.

In some situations with drawer-shaped card socket devices, a separate notch may be disposed inside the card socket device so as to fix the inserted attachable card MC thereto. In these cases, it may be beneficial to include additional components, such as a spring for pushing the attachable card MC in a side direction so as to separate the attachable card MC, or a latch device for preventing loss of the pushed attachable card MC. However, these additional components have some drawbacks.

Thus, in the card socket device 10 according to some exemplary embodiments, when the attachable card MC is mounted on the card socket device 10, the bended portion of the attachable card MC may be engaged with the bended portion of the inner surface 11Win of the card socket device 10, and therefore, the attachable card MC may be fixed to or joined with the card socket device 10.

In some embodiments, the card socket device 10 and the top surface of the attachable card MC, when inserted into the card socket device 10, may be covered by a lid or the like included in an electronic apparatus on which the card socket device 10 is mounted. For example, the lid may retain the attachable card MC in the card socket device 10, thereby reducing the possibility that the attachable card MC may be separated from the card socket device 10 through an upper opened space of the card socket device 10. Therefore, in certain embodiments, the card socket device 10 does not need a separate component for retaining the attachable card MC, so that it is possible to prevent an increase in the volume of the electronic apparatus and an increase in the number of assembly processes. In some embodiments, the lid may be a part of the electronic apparatus that includes the card socket device 10 and may be provided for components other than the card socket device 10. For example, the lid may be a common member that covers at least one interior component of the electronic apparatus (for example, a battery) other than the card socket device 10. The lid will be described in further detail with reference to FIGS. 14B and 14C.

In some exemplary embodiments, the card socket device 10 may further include a fixing member configured to fix the attachable card MC to the upper inner surface of the sidewall portion 11W of the card socket device 10. In certain embodiments, it may be possible to more stably retain the attachable card MC in the card socket device 10 by including the fixing member in addition to the lid. An example fixing member will be described in further detail with reference to FIGS. 8A to 8C.

Returning to FIG. 1, in some embodiments, the connection terminal portions 13 may be formed on the bottom portion 11G. The connection terminal portions 13 may face the connection pad MCC formed in the bottom surface MCB of the attachable card MC. The connection terminal portions 13 may include, for example, a power supply terminal, a data input/output terminal, a clock terminal, etc.

When the attachable card MC is mounted on the bottom portion 11G of the seat portion 11, the connection terminal portions 13 may be electrically connected to the connection pad MCC formed in the attachable card MC. The connection terminal portions 13 included in the card socket device 10 may be formed from a medium that allows for an electrical connection between the attachable card MC and an electronic apparatus (not illustrated) which includes the card socket device 10. Therefore, in some embodiments, the connection terminal portions 13 may be electrically connected to both of the attachable card MC and the electronic apparatus on which the card socket device 10 is mounted.

In some embodiments, the connection terminal portions 13 may have a fin shape. For example, the connection terminal portions 13 having a fin shape may by configured such that a portion of the connection terminal portions 13 protrude upwardly as the connection terminal portions 13 extends parallel with the bottom portion 11G, but exemplary embodiments are not limited thereto. In some exemplary embodiments, the connection terminal portions 13 may include flexible or bendable members having elasticity or extensibility in a direction perpendicular to the top surface of the bottom portion 11G. For example, the connection terminal portions 13 may be a spring, and the connection terminal portion 13 may have a structure in which a conductive ball is formed on the spring.

In certain embodiments, a protruding portion of a fin of the connection terminal portions 13 may be formed such that, when the detachable card MC is not mounted into the card socket device 10, the connection terminal portions 13 may be disposed at a position higher than a position when the attachable card MC is mounted. For example, when the attachable card MC is inserted into the card socket device 10, the protruding portion of the fin of the connection terminal portion 13 may be compressed by the attachable card MC, thereby improving the quality and stability of the connection.

Figure 3:
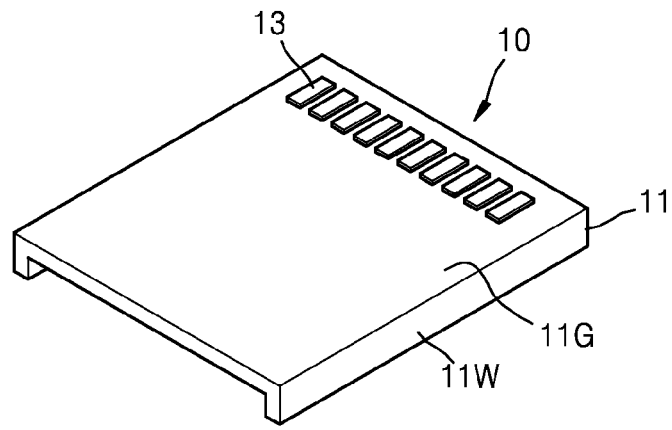
FIG. 3 is a perspective view of a rear surface of the card socket device of certain exemplary embodiments, such as the embodiments of FIG. 1.

FIG. 3 is a perspective view of the rear surface of the exemplary card socket device 10 of FIG. 1.

Referring to FIG. 3, in some embodiments, the connection terminal portions 13 may be exposed from the rear surface of the card socket device 10. For example, one end of the connection terminal portions 13 may protrude from the front surface of the card socket device 10 to be connected to the connection pad MCC of the attachable card MC. The other end of the connection terminal portions 13 may protrude from the rear surface of the card socket device 10 to be electrically connected to a main board of the electronic apparatus. While FIG. 3 illustrates the connection terminal portions 13 exposed from the rear surface of the card socket device 10 so as to allow for greater stability in the connection to the electronic apparatus, the exemplary embodiments are not limited thereto.

Figure 4:
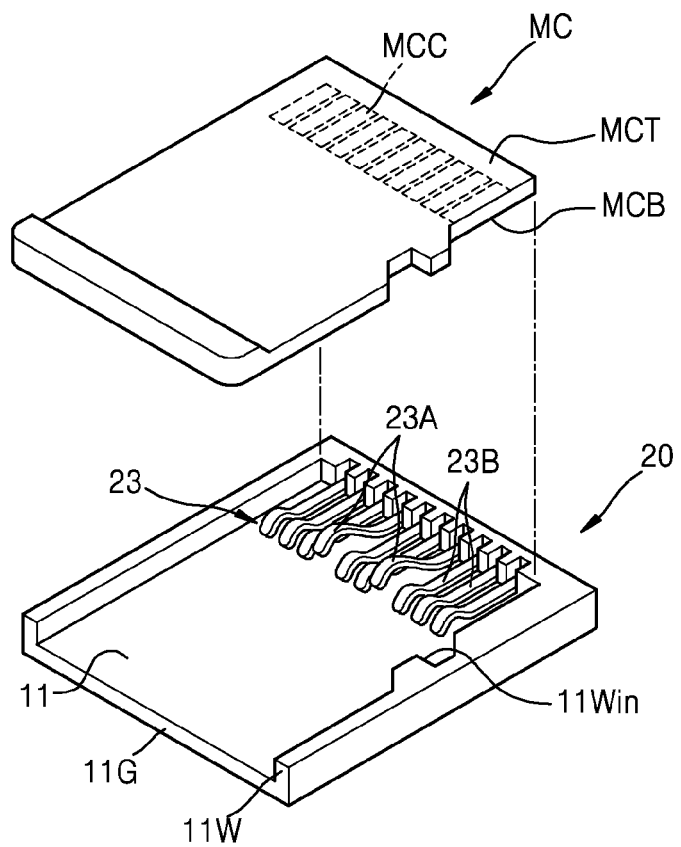
FIG. 4 is a perspective view of a card socket device according to certain exemplary embodiments.
Figure 5:
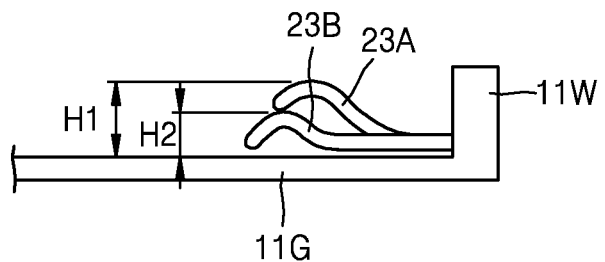
FIG. 5 is a side cross-sectional view for describing a height difference between connection terminal portions in the card socket device of certain exemplary embodiments, such as the embodiments of FIG. 4.

FIG. 4 is a perspective view of a card socket device 20 according to some exemplary embodiments. FIG. 5 is a side cross-sectional view for describing a height difference between connection terminal portions 23A and 23B in the exemplary card socket device 20 of FIG. 4. The card socket device 20 of FIG. 4 may be substantially similar to the card socket device 10 of FIG. 1, except for the shapes of the connection terminal portions 23A and 23B. The same reference numerals denote the same members, which will be described briefly.

Referring to FIGS. 4 and 5, the card socket device 20 may include a seat portion 11 configured to allow a top surface MCT of an attachable card MC to remain exposed, and one or more connection terminal portions 23 formed on the seat portion 11 to be electrically connected to one or more connection pads MCC formed on a bottom surface MCB of the attachable card MC. The attachable card MC may be directly inserted into the card socket device 20 through an upper opened space of the card socket device 20.

The connection terminal portions 23 may include one or more first connection terminals 23A and one or more second connection terminals 23B. As illustrated in FIG. 5, in some embodiments, a height H1 of the uppermost surface of the first connection terminal 23A may be higher than a height H2 of the uppermost surface of the second connection terminal 23B. In certain embodiments, the connection terminal portions 23 may have a fin shape having a protruding portion, and the protruding portions of the first and second connection terminals 23A and 23B may be the uppermost surfaces of the first and second connection terminals 23A and 23B.

In some embodiments, a height difference between the first and second connection terminals 23A and 23B may create a first, preliminary contact and a second, subsequent contact between the attachable card MC and the connection terminal portions 23 so as to drive the attachable card MC in an electrically stable manner. For example, the first connection terminal 23A for which a preliminary contact is desired may be disposed at a position higher (e.g., H1) than a position of the second connection terminal 23B (e.g., H2) for which the subsequent contact is desired, thereby allowing the first connection terminal 23A to come into contact with the attachable card MC before the second connection terminal 23B comes into contact with the attachable card MC. Therefore, in some embodiments, it may be possible to prevent the plurality of connection terminal portions 23 from coming into contact with the plurality of connection pads MCC of the attachable card MC at random or to enable the plurality of connection terminal portions 23 to come into contact with the plurality of connection pads MCC in a predetermined order based on the relative heights of the connection terminal portions 23.

In some exemplary embodiments, the first connection terminal 23A may be a power supply terminal, and the second connection terminal 23B may be a data input/output terminal. The first connection terminal 23A that is, for example, the power supply terminal may come into contact with the attachable card MC first, thereby improving electrical stability of the attachable card MC. Subsequently, the second connection terminal 23B that is, for example, the data input/output terminal may come into contact with the attachable card, allowing for electrical driving of the attachable card MC in a more stable state.

Although the seat portion 11 is illustrated as including the bottom portion 11G and the sidewall portions 11W in FIG. 5, exemplary embodiments are not limited thereto. As described above, the card socket device 20 according to the exemplary embodiments may be formed in any shape as long as the card socket device 20 exposes the top surface of the attachable card MC when the attachable card MC is inserted thereto. In some exemplary embodiments, the sidewall portions 11W of the seat portion 11 may be omitted.

Figure 6:
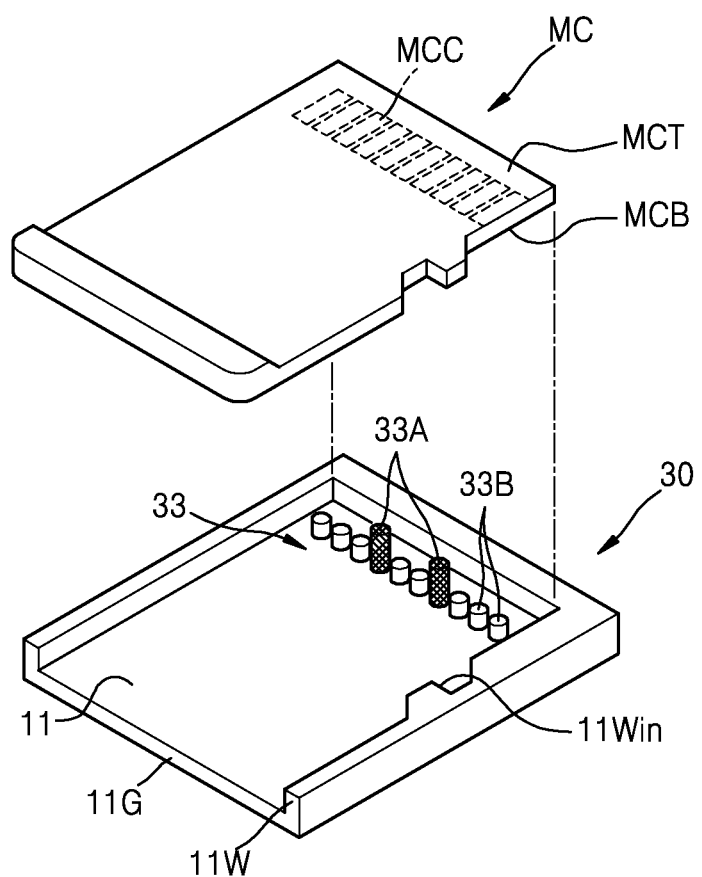
FIG. 6 is a perspective view of a card socket device according to certain exemplary embodiments.
Figure 7:
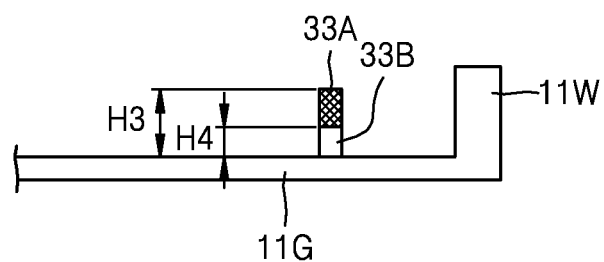
FIG. 7 is a side cross-sectional view for describing a height difference between connection terminal portions in the card socket device of certain exemplary embodiments, such as the embodiments of FIG. 6.

FIG. 6 is a perspective view of a card socket device 30 according to some exemplary embodiments. FIG. 7 is a side cross-sectional view for describing a height difference between connection terminal portions 33A and 33B in the exemplary card socket device of FIG. 6. The card socket device 30 of FIG. 6 may be substantially similar to the card socket device 20 of FIG. 4 except for a shape of the connection terminal portions 33.

Referring to FIGS. 6 and 7, the card socket device 30 may include a seat portion 11 configured to allow a top surface MCT of an attachable card MC to remain exposed, and one or more connection terminal portions 33 formed on the seat portion 11 to be electrically connected to one or more connection pads MCC formed on a bottom surface MCB of the attachable card MC. In some embodiments, the connection terminal portions 33 may be formed of elastic flexible or bendable member having elasticity or extensibility in a direction perpendicular to the top surface of the bottom portion 11G. For example, connection terminal portions 33 may be a spring or coil.

The connection terminal portions 33 may include a first connection terminal 33A and a second connection terminal 33B. As illustrated in FIG. 7, a height H3 of the uppermost surface of the first connection terminal 33A may be higher than a height H4 of the uppermost surface of the second connection terminal 33B.

As described above, the height difference between the first and second connection terminals 33A and 33B may create a first, preliminary preceding contact and a second, subsequent contact between the attachable card MC and the connection terminal portions 33 so as to drive the attachable card MC in an electrically stable manner. In some exemplary embodiments, the first connection terminal 33A may be a power supply terminal, and the second connection terminal 33B may be a data input/output terminal.

Figure 8A:
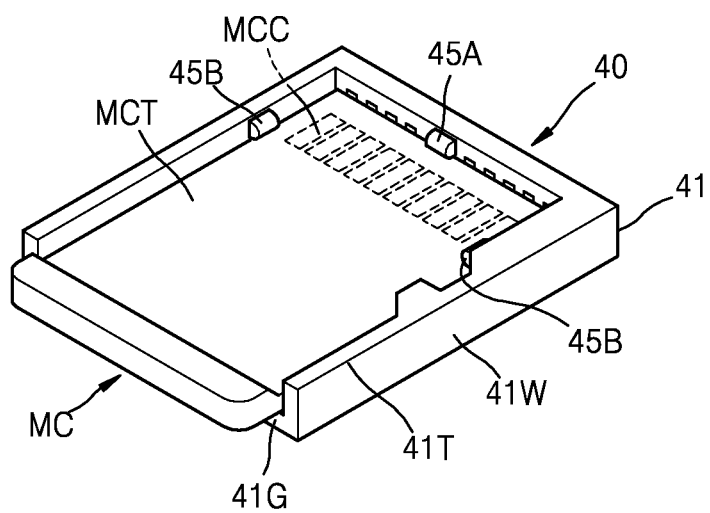
FIGS. 8A, 8B, and 8C are respectively a perspective view, a plan view, and a cross-sectional view of a card socket device into which an attachable card MC is inserted, according to certain exemplary embodiments.
Figure 8B:
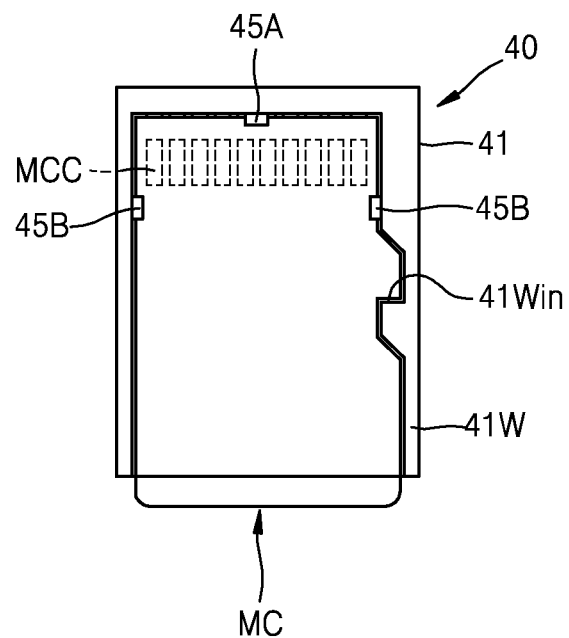
Figure 8C:
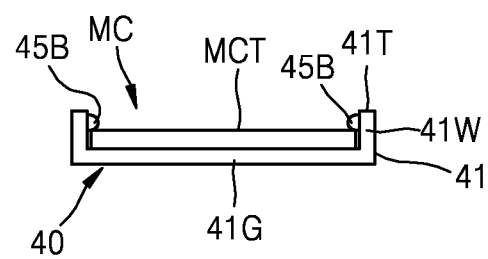

FIGS. 8A, 8B, and 8C are respectively a perspective view, a plan view, and a cross-sectional view of a card socket device 40 into which an attachable card MC is inserted, according to certain exemplary embodiments. The card socket device 40 of FIGS. 8A to 8C is substantially similar to the card socket device 10 of FIG. 1, except that a height of a top surface 41T of sidewall portions 41W is higher than a height of a top surface MCT of the attachable card MC, and the card socket device 40 further may include fixing members 45A and 45B formed in an upper inner surface of one or more sidewall portions 41W.

Referring to FIGS. 8A and 8C, the card socket device 40 may include a seat portion 41 configured to allow the top surface MCT of the inserted attachable card MC to remain exposed. The card socket device 40 also may include one or more connection terminal portions (not shown) formed on the seat portion 41 to form an electrical connection with one or more connection pads MCC formed on a bottom surface MCB (not shown) of the attachable card MC.

The seat portion 41 may include a bottom portion 41G and one or more sidewall portions 41W. A height of the top surface 41T of the sidewall portions 41W may be higher than a height of a top surface MCT of the attachable card MC. Fixing members 45A and 45B may be formed on an upper inner surface of one or more sidewall portions 41W. The fixing members 45A and 45B may protrude from the inner surface of one or more sidewall portions 41W and overlap portions of the inserted attachable card MC.

In some embodiments, the first fixing member 45A may be disposed substantially in parallel with an arrangement direction of the connection pads MCC of the attachable card MC and may be formed to retain a front-end of the attachable card MC adjacent to, or in contact with, the connection pads MCC. The second fixing members 45B may be formed to retain either or both sides of the attachable card MC relative to the front-end. In some exemplary embodiments, the first fixing member 45A, which is disposed adjacent to the front-end of the attachable card MC, may be replaced with a visor for inducing an insertion direction of the attachable card MC. The above configuration will be described in detail with reference FIGS. 9A and 9B.

In certain embodiments, the fixing members 45A and 45B may protrude and/or overlap portions of the attachable card MC to an extent that fixing members 45A and 45B retain the attachable card MC, but limit impedance to the insertion or removal of the attachable card MC through an opened upper surface of the card socket device 40. For example, when the attachable card MC is inserted or removed through the opened upper surface of the card socket device 40, a user may apply an upward or downward force sufficient to overcome latch resistance caused by the fixing members 45A and 45B. In some embodiments, the fixing members 45A and 45B may have a shape that allows the attachable card MC to be inserted or removed without damaging the attachable card MC, while also preventing or inhibiting the attachable card MC from being separated or removed unintentionally from the card socket device 40 due to, for example, vibration, sudden jolts or movements, inadvertent contact, etc.

For example, the fixing members 45A and 45B may have rounded corners so as to reduce or minimize latch resistance caused by the fixing members 45A and 45B when the attachable card MC is inserted into or removed from the card socket device 40.

Although the fixing members 45A and 45B are illustrated as having substantially similar thicknesses to the attachable card MC in FIGS. 8A to 8C for convenience of description, exemplary embodiments are not limited thereto. For example, the fixing members 45A and 45B may have a thickness substantially equal to or less than half the thickness of the attachable card MC. In some exemplary embodiments, the number or arrangement of the fixing members 45A and 45B may be freely selected. In some exemplary embodiments, the first fixing member 45A may be omitted.

Figure 9A:
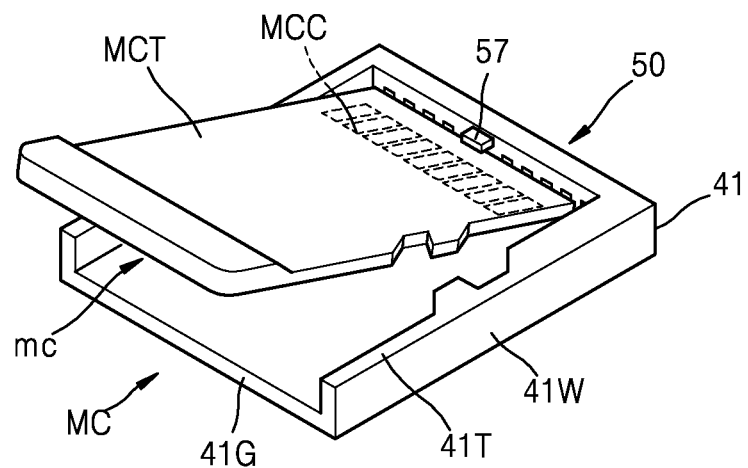
FIGS. 9A and 9B are perspective views of a card socket device into which an attachable card MC is being inserted, according to certain exemplary embodiments.
Figure 9B:
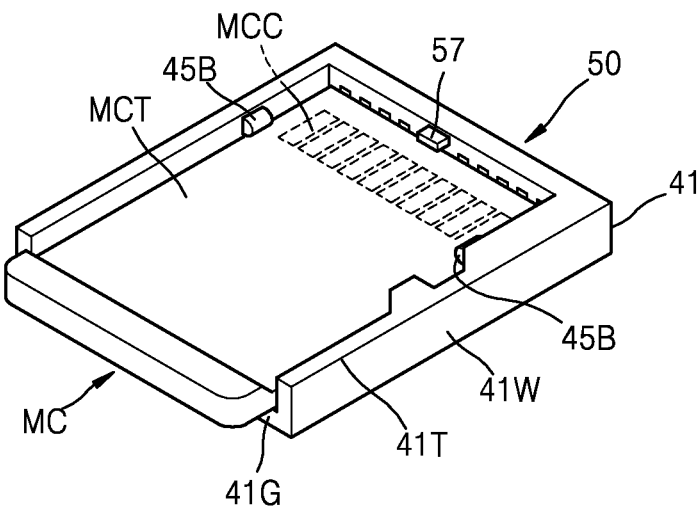

FIGS. 9A and 9B are perspective views of a card socket device 50 into which an attachable card MC is being inserted, according to some exemplary embodiments. The card socket device 50 of FIGS. 9A and 9B may be substantially similar to the card socket device 10 of FIG. 1, except that a height of a top surface 41T of one or more sidewall portions 41W may be higher than a height of a top surface MCT of the attachable card MC and the card socket device 50 may further include a visor in an upper inner surface of one or more of the sidewall portions 41W.

Referring to FIGS. 9A and 9B, the card socket device 50 may include a seat portion 41 configured to allow the top surface MCT of the inserted attachable card MC to remain exposed. The card socket device 50 may also include one or more connection terminal portions (not shown) formed on the seat portion 41 to form an electrical connection with one or more connection pads MCC formed on a bottom surface MCB (not shown) of the attachable card MC.

The seat portion 41 may include a bottom portion 41G and one or more sidewall portions 41W. A height of the top surface 41T of the sidewall portions 41W may be higher than a height of the top surface MCT of the attachable card MC. The visor 57 may be formed in the sidewall portion 41W adjacent to the connection pads MCC, the visor 57 being disposed substantially in parallel with an arrangement direction of the connection pads MCC of the attachable card MC and may be formed to retain or hold a front-end of the attachable card MC adjacent to, or in contact with, the connection pads MCC.

The visor 57 may protrude from the inner surface of the sidewall portion 41W. In certain embodiments, the visor 57 may protrude and/or overlap portions of the attachable card MC to an extent that the visor 57 may direct insertion of or retain the attachable card MC but does not impede insertion or removal of the attachable card MC through an opened upper surface of the card socket device 50. In some embodiments, the user may place a front-end of the attachable card MC under the visor 57 and insert the remaining portion of the attachable card MC into the card socket device 50. For example, by its design, the visor 57 may direct or induce insertion of the attachable card MC in a desired direction.

Referring to FIG. 9B, in some embodiments, card socket device 50 may include fixing members 45B. The fixing members 45B may be formed on an upper inner surface of one or more sidewall portions 41W and may protrude from the inner surface of one or more sidewall portions 41W, overlapping portions of the inserted attachable card MC. In certain embodiments, the fixing members 45B may be formed to hold or retain either or both sides of the attachable card MC relative to the front-end.

Figure 10:
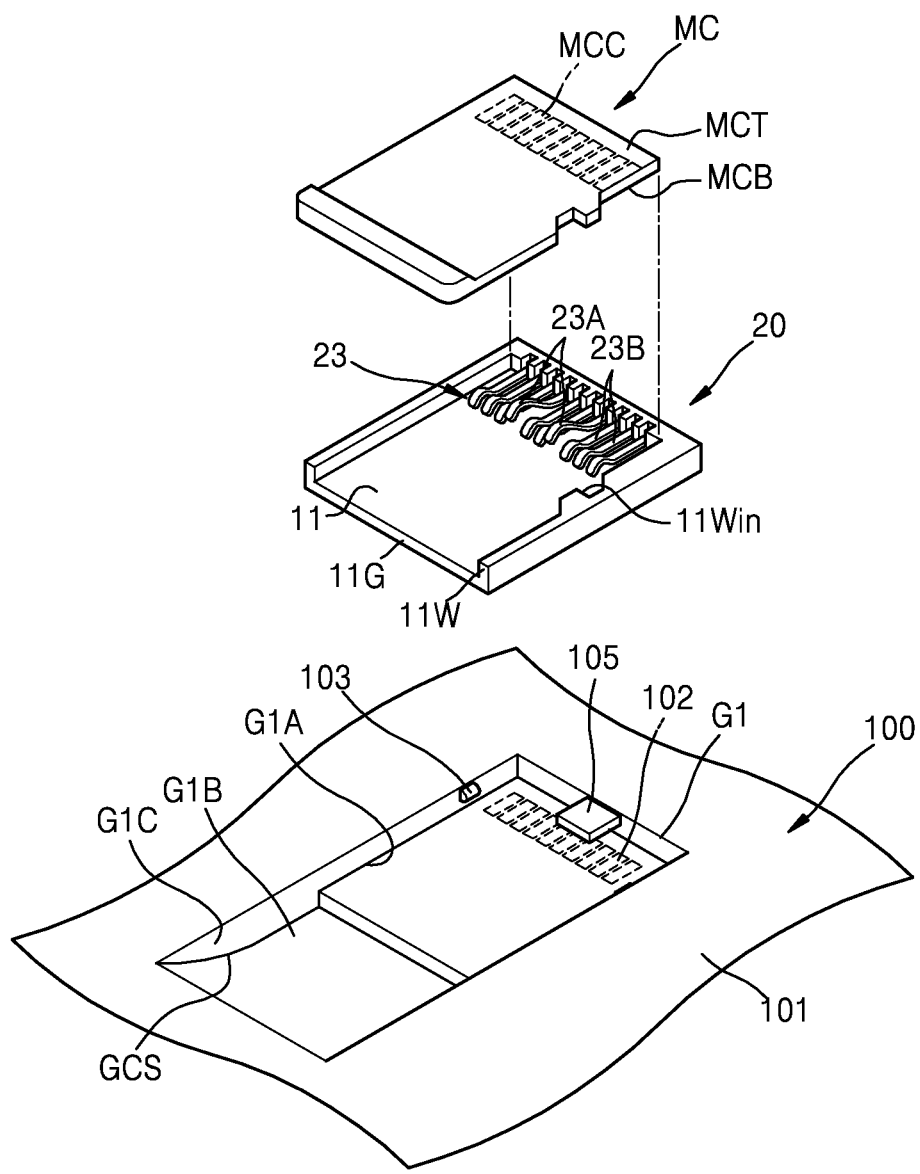
FIG. 10 is an exploded perspective view of a card socket device and an electronic apparatus accommodating the card socket device, according to certain exemplary embodiments.

FIG. 10 is an exploded perspective view of a card socket device 20 and an electronic apparatus 100 accommodating the card socket device 20, according to some exemplary embodiments.

Referring to FIG. 10, a casing frame 101 of the electronic apparatus 100 may include an accommodating groove G1 configured to hold or accommodate and separate the card socket device 20 and the attachable card MC inserted into the card socket device 20. The casing frame 101 may cover a main board (e.g., including semiconductor devices, processors, central processing units (CPUs), etc.) inside the electronic apparatus 100.

The card socket device 20 may be accommodated in the accommodating groove G1. One or more connection terminal portions 23 exposed from a rear surface of the card socket device 20 may be electrically connected to the main board by one or more connection pads 102 formed on a bottom surface of the accommodating groove G1.

A visor 105 which directs or induces an insertion direction of the attachable card MC or one or more fixing members 103, which may retain or hold the attachable card MC, may be formed in an upper inner surface of the accommodating groove G1.

In some embodiments, accommodating groove G1 may include accommodating grooves G1A, G1B, and G1C, which may form the interior sides of accommodating groove G1. Specifically, the accommodating groove G1 may include a first accommodating groove G1A configured to accommodate the card socket device 20 and the attachable card MC inserted into the card socket device 20. In addition, the accommodating groove G1 may include a second accommodating groove G1B and a third accommodating groove G1C which are provided to facilitate separation of the attachable card MC.

The second accommodating groove G1B may be formed to be disposed under an end of the attachable card MC when the attachable card MC is inserted into the card socket device 20. The second accommodating groove G1B may be attached and/or adjacent to the first accommodating groove G1A. In addition, a bottom surface of the second accommodating groove G1B may be lower than a bottom surface of the first accommodating groove G1A. Therefore, a space may be defined between a bottom surface of the end of the attachable card MC and the bottom surface of the second accommodating groove G1B. The above configuration will be described in further detail with reference to FIGS. 11A and 11B.

The third accommodating groove G1C may be attached and/or adjacent to the second accommodating groove G1B.

In addition, a bottom surface of third accommodating groove G1C may have a height that gradually increases from a height of the bottom surface of the second accommodating groove G1B to a height of the top surface of the casing frame 101. That is, the third accommodating groove G1C may have a slope GCS at which the height of the bottom surface of the third accommodating groove G1C gradually increases. The above configuration will be described in further detail with reference to FIGS. 11A and 11B.

In some embodiments, the visor 105 may be disposed in the upper inner surface of the accommodating groove G1 to direct or induce a direction in which the attachable card MC is inserted into the card socket device 20. In some embodiments, the visor 105 may protrude and/or overlap portions of the attachable card MC to an extent that the visor 105 may direct insertion of or retain the attachable card MC but does not impede insertion or removal of the attachable card MC through an opened top surface of the card socket device 20. The user may place a front-end of the attachable card MC under the visor 105 and insert a remaining portion of the attachable card MC into the card socket device 20. For example, by its design, the visor 105 may direct or induce insertion of the attachable card MC in a desired direction In addition, the one or more fixing members 103 may be disposed in an upper inner surface of the accommodating groove G1 to fix the attachable card MC mounted on the card socket device 20. The one or more fixing members 103 may protrude from the upper inner surface of the accommodating groove G1, overlapping portions of the inserted attachable card MC. In some embodiments, the one or more fixing members 103 may protrude and/or overlap portions of the attachable card MC to an extent that allows one or more fixing members 103 to retain the attachable card MC, but limit impedance to the insertion or removal of the attachable card MC from card socket device 20 by an external force without damaging the attachable card MC, while also preventing or inhibiting the attachable card MC from being separated or removed unintentionally from the card socket device 20 due to, for example, vibration, sudden jolts and movements, inadvertent contact, etc. For example, the fixing member 103 may have rounded corners so as to reduce or minimize latch resistance caused by the one or more fixing members 103 when the attachable card MC is inserted into or removed from the card socket device 20.

The electronic apparatus 100 according to some exemplary embodiments may include the card socket device 20 configured to allow a top surface MCT of an inserted attachable card MC to be exposed, the fixing member 103 to be formed in the accommodating groove G1, and the second accommodating groove G1B to be formed, resulting in a simple structure while allowing insertion, retention, and removal of the attachable card MC. Therefore, it may be possible to prevent an increase in cost due to a greater number of card socket devices, an increase in the number of components, or an increase in the number of assembly processes.

Although the electronic apparatus 100 is illustrated as including the card socket device 20 of, for example, FIG. 4 in the embodiment of FIG. 10, exemplary embodiments are not limited thereto. In some embodiments, the electronic apparatus 100 may include, for example, the card socket devices 10 illustrated in FIGS. 1 to 3 and, for example, the card socket devices 30, 40, or 50 illustrated in FIGS. 6 to 9B.

Figure 11A:
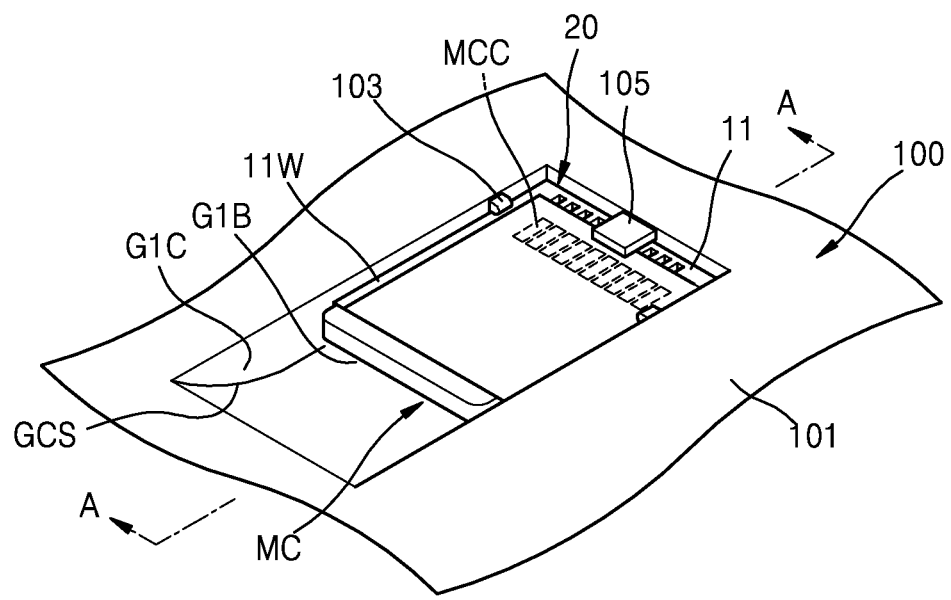
FIGS. 11A and 11B are respectively a perspective view and a cross-sectional view of the electronic apparatus of certain exemplary embodiments, such as the embodiments of FIG. 10, in which a card socket device is accommodated.
Figure 11B:
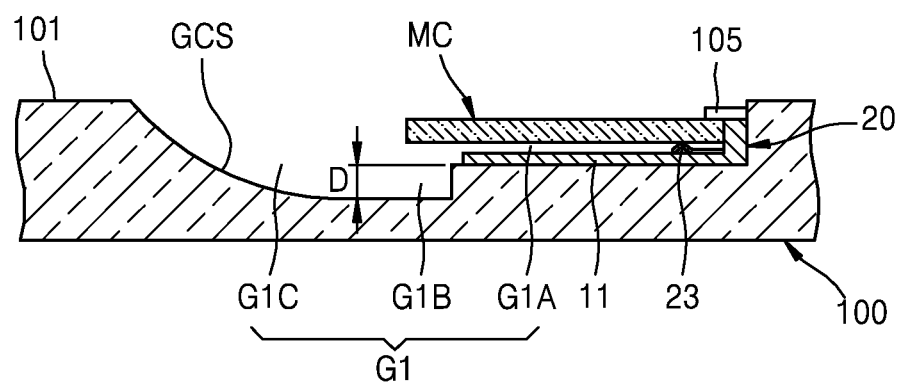

FIGS. 11A and 11B are respectively a perspective view and a cross-sectional view of the exemplary embodiment of the electronic apparatus 100 of FIG. 10 accommodating the card socket device 20. FIG. 11B is a cross-sectional view taken along a line A-A of FIG. 11A.

Referring to FIGS. 11A and 11B, in some embodiments, the second accommodating groove G1B may be formed to be disposed under an end of an attachable card MC. For example, the second accommodating groove G1B may have a bottom surface that is recessed to have a stepped portion D with respect to the bottom surface the first accommodating groove G1A into which the card socket device 20 is inserted. Therefore, in certain embodiments, a space may be defined between a bottom surface of the end of the attachable card MC and the bottom surface of the second accommodating groove G1B.

The space defined by the second accommodating groove G1B may be used to create a gap or separation when the attachable card MC is fully inserted into the card socket device 20. For example, it may be possible to allow the attachable card MC to be easily separated from the card socket device 20 by lifting the bottom surface of the end of the attachable card MC, which is exposed through the space or gap, by a hand or nail of a user, a relatively-sharp tool, or the like.

The third accommodating groove G1C may be attached and/or adjacent to the second accommodating groove G1B. In addition, a bottom surface of third accommodating groove G1C may have a height that gradually increases from a height of the bottom surface of the second accommodating groove G1B to a height of the top surface of the casing frame 101. For example, the bottom surface of the third accommodating groove G1C may have a slope GCS.

The third accommodating groove G1C may be a passage through which a hand of the user easily may reach the second accommodating groove G1B. For example, the user may reach the second accommodating groove G1B through the third accommodating groove G1C that is attached and/or adjacent to the second accommodating groove G1B and the bottom surface of the second accommodating groove G1B that has a lower height than the height of the top surface of the casing frame 101. Therefore, in some embodiments, an area, width, depth, or the like of the third accommodating groove G1C may be freely selected. In certain embodiments, the third accommodating groove G1C may be omitted.

The visor 105, which may be formed in the upper inner surface of the accommodating groove G1, may protrude and/or overlap portions of the attachable card MC to an extent that the visor 105 may direct insertion of or retain the attachable card MC is latched but does not impede insertion or removal of the attachable card MC through an opened upper surface of the card socket device 50. For example, by its design, the visor 105 may retain the attachable card MC.

Although the fixing member 103 and the visor 105 are illustrated as being included in the accommodating groove G1, as shown in FIGS. 10, 11A and 11B, exemplary embodiments are not limited thereto. In some embodiments, the electronic apparatus 100 including the card socket device 20 may or may not selectively include the fixing member 103 and/or the visor 105.

Figure 12:
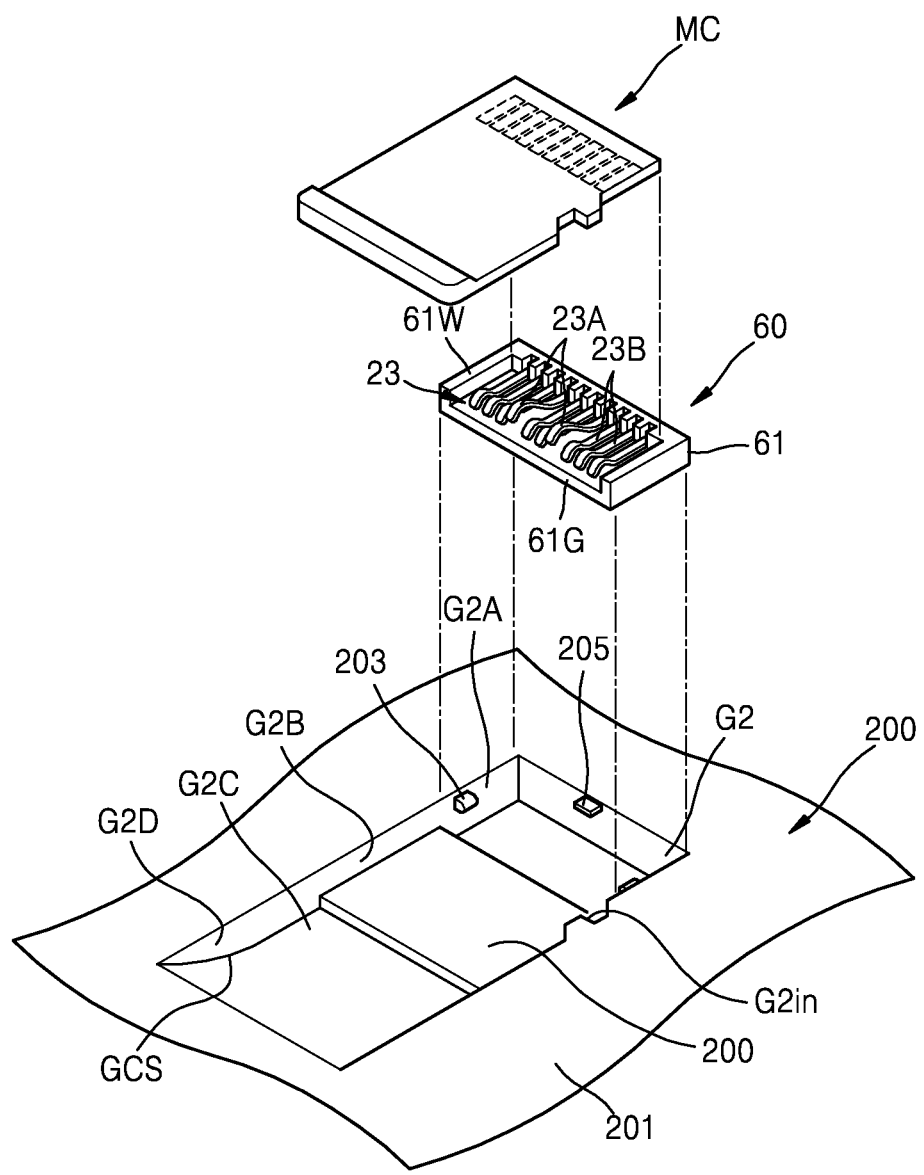
FIGS. 12 and 13 are exploded perspective views of a card socket device and an electronic apparatus accommodating the card socket device, according to certain exemplary embodiments.

FIG. 12 is an exploded perspective view of a card socket device 60 and an electronic apparatus 200 accommodating the card socket device 60, according to certain exemplary embodiments. The electronic apparatus 200 of FIG. 12 may be substantially similar to the electronic apparatus 100 of FIG. 10, except for a size of the card socket device 60 and a shape of an accommodating groove G2 corresponding to the size of the card socket device 60.

Referring to FIG. 12, for example, a seat portion 61 may include a bottom portion 61G on which an attachable card MC may be mounted and a sidewall portion 61W which may face one or more sides of the attachable card MC. In some embodiments, an area in which the bottom portion 61G of the seat portion 61 overlaps the attachable card MC may be smaller than half an area of the attachable card MC. For example, the seat portion 61 of the card socket device 60 may be formed to have an area that is of a size small enough to support little more than the connection terminal portions 23.

A casing frame 201 of the electronic apparatus 200 may include, for example, the accommodating groove G2 configured to accommodate the insertion and removal of the card socket device 60 and the attachable card MC inserted into the card socket device 60.

In some embodiments, accommodating groove G2 may include accommodating grooves G2A, G2B, and G2C, which may form the interior sides of accommodating groove G2. Specifically, the accommodating groove G2 may include a first accommodating groove G2A configured to accommodate the card socket device 60 and a portion of the attachable card MC disposed on the card socket device 60. The accommodating groove G2 may a second accommodating groove G2B configured to be attached and/or adjacent to the first accommodating groove G2A and accommodate the remaining portion of the attachable card MC, which sticks out of the first accommodating groove G2A.

An inner surface G2*in* of the second accommodating groove G2B may have a shape corresponding to a side of the attachable card MC so as to be engaged with the side of the attachable card MC. The side of the attachable card MC may have a bended portion. The inner surface 2G*in* of the second accommodating groove G2B may be formed to define the bended portion of the side of the attachable card MC. For example, a space defined by the second accommodating groove G2B may correspond to a specific shape of the attachable card MC. The user may visually check a shape of the space defined by the second accommodating groove G2B.

That is, the user may insert the attachable card MC into the space defined by the second accommodating groove G2B while fitting the attachable card MC into the space. Therefore, it may be possible to limit or prevent damage to the attachable card MC and/or the card socket device 60, such as damage that may be caused when the attachable card MC is inserted in a wrong direction. In addition, the user may determine whether a certain attachable card is compatible with the card socket device 60 by comparing a shape of the space defined by the second accommodating groove G2B with a shape of the certain attachable card. Therefore, it may be possible to limit or prevent damage to the attachable card MC or the card socket device 60, such as damage that may be caused due to insertion of the attachable card which is incompatible with the card socket device 60.

In some embodiments, when the attachable card MC is mounted on the card socket device 60, the bended portion of the attachable card MC may be engaged with or adjacent to the bended portion of the inner surface G2*in* of the second accommodating groove G2B. Therefore, the attachable card MC may be fixed to the accommodating groove G2.

In addition, the accommodating groove G2 may include a third accommodating groove G2C and a fourth accommodating groove G2D which may be provided to facilitate separation or removal of the attachable card MC.

Figure 13:
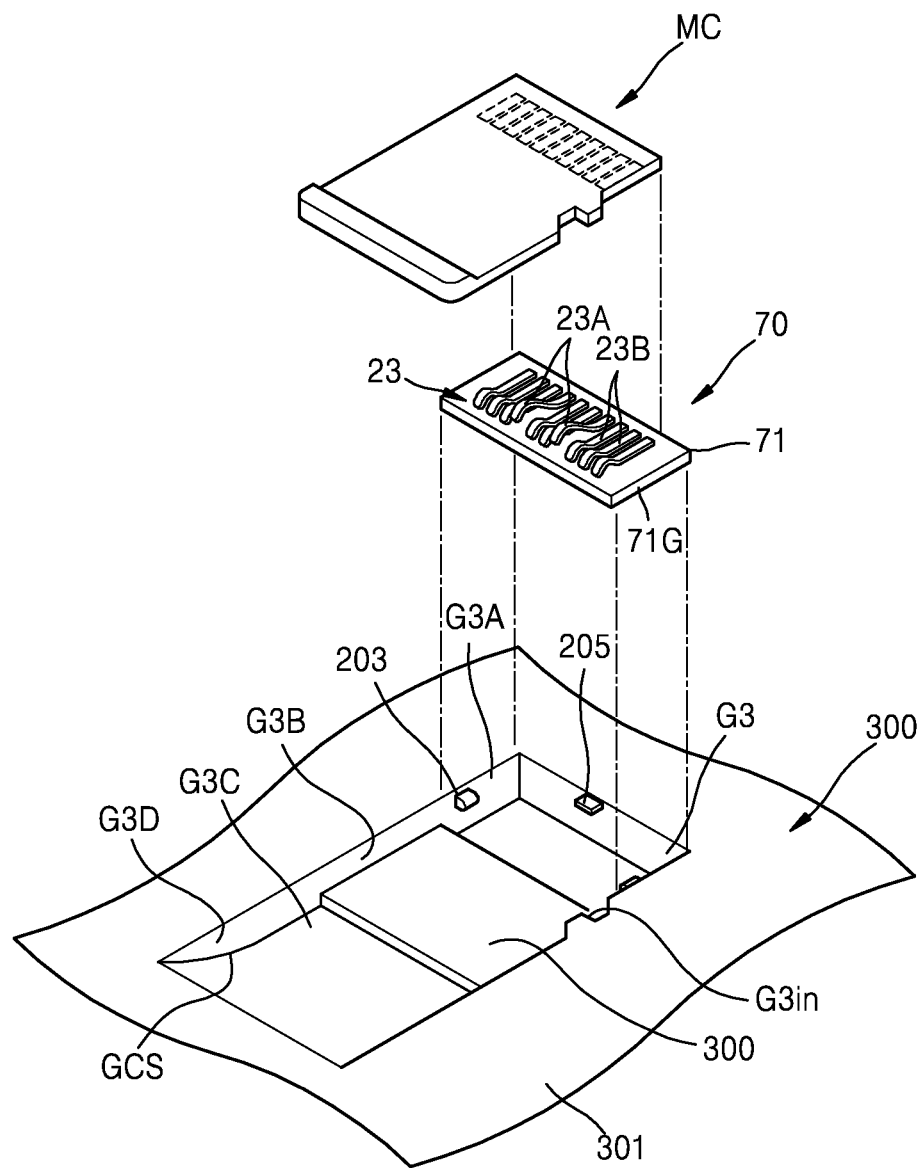

FIG. 13 is an exploded perspective view of a card socket device 70 and an electronic apparatus 300 accommodating the card socket device 70, according to certain exemplary embodiments. The electronic apparatus 300 of FIG. 13 is substantially similar to the electronic apparatus 100 of FIG. 11, except for a shape of the card socket device 70 and a shape of an accommodating groove G3 corresponding to the shape of the card socket device 70.

Referring to FIG. 13, for example, the card socket device 70 may include a substantially planar portion 71 having a plate shape and one or more connection terminal portions 23 formed on the bottom portion 71G. In some embodiments, the card socket device 70 may not include a sidewall portion along the outside edges of the bottom portion 71G, and therefore, may have a reduced area and volume.

In certain embodiments, a casing frame 301 of the electronic apparatus 300 may include an accommodating groove G4 that may be reduced so as to correspond to the reduced area and volume of the card socket device 70. The accommodating groove G4 may include, in some embodiments, first to fourth accommodating grooves G3A, G3B, G3C, and G3D, and a space in which the card socket device 70 may be accommodated.

As described with reference to FIG. 12, a portion of the attachable card MC may be accommodated in the first accommodating groove G3A, and the remaining portion of the attachable card MC, which may extend beyond the first accommodating groove G3A, may be accommodated in the second accommodating groove G3B. The third accommodating groove G3C and the fourth accommodating groove G3D may be provided to facilitate separation or removal of the attachable card MC.

In some embodiments, an inner surface G3*in* of the second accommodating groove G3B may have a shape corresponding to a side of the attachable card MC so as to be engaged with the side of the attachable card MC. When the attachable card MC is mounted on the card socket device 70, for example, a bended portion of the attachable card MC may be engaged with a bended portion of the inner surface G3*in* of the second accommodating groove G3B. Therefore, the attachable card MC may be fixed to or retained in the accommodating groove G3.

Figure 14A:
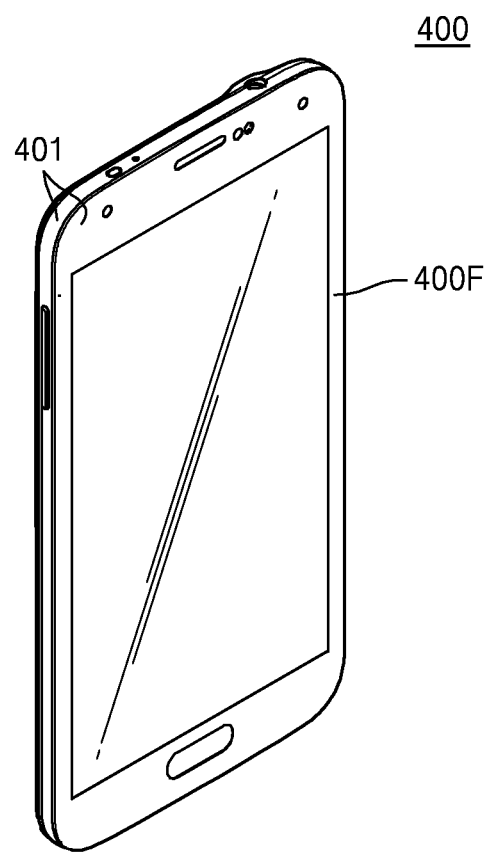
FIG. 14A is a perspective view of a mobile terminal including a card socket device, according to certain exemplary embodiments.

FIG. 14A is a perspective view of a mobile terminal 400 including a card socket device, according to certain exemplary embodiments.

Referring to FIG. 14A, for example, a front portion 400F of the mobile terminal 400 may have an appearance or shape formed by a casing frame 401 that may be configured to cover an inner main board or the like. In some embodiments, the casing frame 401 may expose a display device to the outside. Although not illustrated, the mobile terminal 400 may include a camera, a receiver, a keypad, or the like in an upper or lower portion of the display device. The camera may be used to perform a video call or capture the image of a user. The receiver may output sound upon a voice call or the playback of a multimedia file. The keypad may include, for example, a call button, a search button, or the like. Further, in some embodiments, a volume control button, a hot key for operating the camera, or the like may be installed in a side of the mobile terminal 400.

Figure 14B:
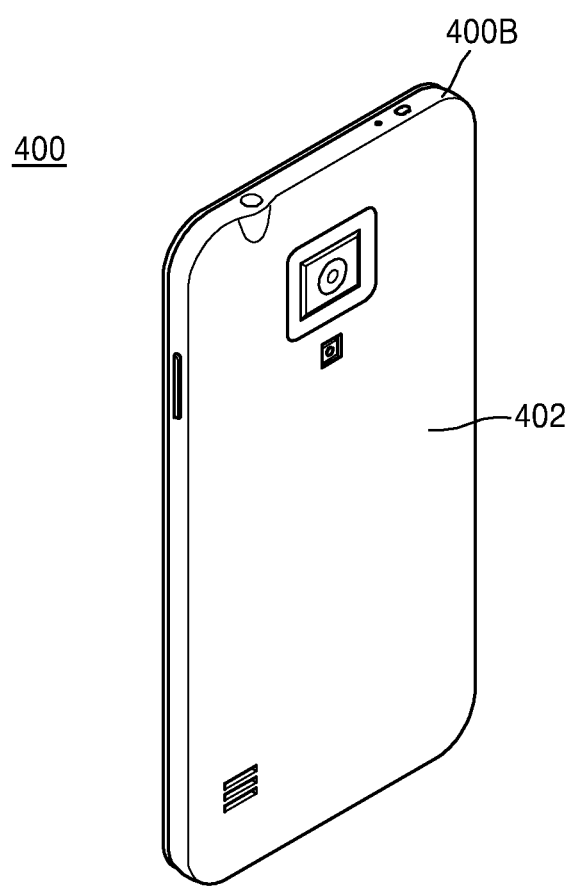
FIG. 14B is a rear perspective view of the mobile terminal of certain exemplary embodiments, such as the embodiments of FIG. 14A, including the card socket device.

FIG. 14B is a rear perspective view of the exemplary mobile terminal of FIG. 14A.

Referring to FIG. 14B, for example, a cover 402 may be configured to cover the casing frame 401 in a rear portion 400B of the mobile terminal 400. In some embodiments, the cover 402 may be formed to substantially or entirely cover the rear portion 400B of the mobile terminal 400 such that, for example, a battery pack, an attachable card, and the like, which may be mounted on the mobile terminal 400, are not exposed. In certain embodiments, the camera and a lighting device, which may be used to capture an object, may be installed in the rear portion 400B of the mobile terminal 400. The camera and the lighting device may be exposed to the outside without being covered by the cover 402.

Figure 14C:
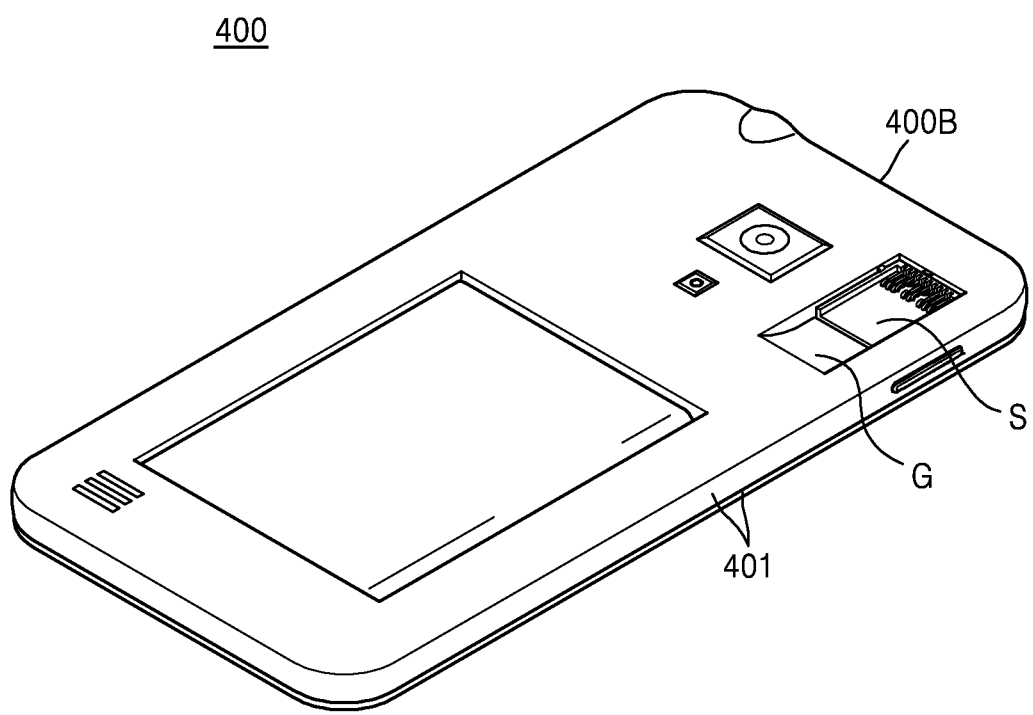
FIG. 14C is a rear perspective view of the mobile terminal of certain exemplary embodiments, such as the embodiments of FIG. 14B, including the card socket device from which a battery cover is separated.

FIG. 14C is a rear perspective view of the exemplary mobile terminal 400 of FIG. 14B from which the cover 402 is separated.

Referring to FIG. 14C, for example, the casing frame 401, which covers the inner main board or the like, may be exposed from the rear portion 400B of the mobile terminal 400 from which the cover 402 is separated or removed. In some embodiments, an accommodating groove G and a card socket device S may be formed in the casing frame 401, and the card socket device S in which the attachable card is inserted may be accommodated in the accommodating groove G.

In some embodiments, the card socket device S may be any one of the card socket devices 10, 20, 30, 40, 50, 60, and 70, such as those that are described with reference to FIGS. 1 to 13. And, in some embodiments, the accommodating groove G may be any one of the accommodating grooves G1, G2, and G3, such as those that are described with reference to FIGS. 10 to 13 and which correspond to the card socket devices 10, 20, 30, 40, 50, 60, and 70.

Although the card socket device S and the accommodating groove G accommodating the card socket device S are illustrated as being disposed in an upper right portion of the rear portion 400B of the mobile terminal 400, exemplary embodiments are not limited thereto. In some exemplary embodiments, the mobile terminal 400 may include a battery-pack accommodating groove that may accommodate a battery pack. For example, the card socket device S and the accommodating groove G accommodating the card socket device S may be formed in a bottom surface of the battery-pack accommodating groove.

Although one card socket device S and one accommodating groove G accommodating the card socket device S are illustrated in FIG. 14C, exemplary embodiments are not limited thereto. In some exemplary embodiments, the mobile terminal 400 may include a plurality of card socket devices into which a plurality attachable cards may be inserted and may further accommodate grooves that respectively accommodate the card socket devices. In some embodiments, the plurality of attachable cards may be of different types. Depending on the types of the plurality of attachable cards, for example, a card socket device and a shape of a relevant accommodating groove may be changed.

The card socket device S and the accommodating groove G, which may be included in the mobile terminal 400, may be used for mounting of various types of attachable cards. For example, when the mobile terminal 400 is a mobile wireless terminal of a global positioning system (GSM) type, the card socket device S and the accommodating groove G accommodating the card socket device S may be provided to mount a SIM card. The SIM card may store information on a terminal subscriber and information associated with a terminal system. Therefore, in some embodiments, when the SIM card is mounted on a terminal, the terminal may be used as a terminal according to information stored in the SIM card, regardless of a type of the terminal.

In addition, a user identify module (UIM) card may be mounted on a mobile wireless terminal of a code division multiple access (CDMA) type.

In addition to the SIM or UIM card, the card socket device S and the accommodating groove G accommodating the card socket device S of the mobile terminal 400 may be used to mount an external memory card as an auxiliary memory device. For example, the memory card may be a T-Flash card. The mobile terminal 400 may have an extended storage space by mounting the external memory card.

In some exemplary embodiments, the mobile terminal 400 may include a first socket configured to mount an identity module card, a second socket configured to mount a memory card, and first and second accommodating grooves configured to respectively accommodate the first socket and the second socket. In this case, each of the first socket and the second socket may be one of the card socket devices 10, 20, 30, 40, 50, 60, and 70 described with reference to FIGS. 1 to 13, and each of the first accommodating groove and the second accommodating groove may be one of the accommodating grooves G1, G2, and G3 described with reference to FIGS. 10 to 13.

While various aspects of the inventive concept have been particularly shown and described with reference to exemplary embodiments thereof, it will be understood that various changes in form and details may be made therein without departing from the spirit and scope of the following claims.

What is claimed is:

1. A card socket device comprising:
a seat portion configured to receive an attachable card; and
one or more connection terminal portions formed in the seat portion and configured to form an electrical connection with one or more connection pads formed in a bottom surface of the attachable card,
wherein the seat portion is configured such that a space accommodating the attachable card is upwardly opened, and
wherein the seat portion includes a bottom portion which faces the bottom surface of the attachable card and on which the one or more connection terminal portions are formed, and one or more sidewall portions that face at least a portion of a side of the attachable card, and wherein an inner surface of the one or more sidewall portions has a shape corresponding to the side of the attachable card so as to be engaged with the side of the attachable card.

2. The card socket device of claim 1, further comprising one or more fixing members disposed in an upper inner surface of the one or more sidewall portions to retain the attachable card.

3. The card socket device of claim 1, further comprising:
a visor configured to protrude from an upper inner surface of a portion of the one or more sidewall portions, which are adjacent to the connection terminal portions, and to direct the attachable card to be inserted in a direction toward the connection terminal portion.

4. The card socket device of claim 1, wherein when the attachable card is mounted on the seat portion, a height of a top surface of the sidewall portion is equal to or lower than a height of a top surface of the attachable card.

5. The card socket device of claim 1, wherein the seat portion has a planar shape.

6. The card socket device of claim 1, wherein when the attachable card is mounted, an area in which the seat portion overlaps the attachable card is smaller than half an area of the attachable card.

7. The card socket device of claim 1, wherein the attachable card is one of a subscriber identity module (SIM) card, a user identity module (UIM) card, and a memory card.

8. A card socket device comprising:
a seat portion configured to receive an attachable card; and
one or more connection terminal portions formed in the seat portion and configured to form an electrical connection with one or more connection pads formed in a bottom surface of the attachable card,
wherein the seat portion is configured such that a space accommodating the attachable card is upwardly opened, and
wherein the one or more connection terminal portions include a first connection terminal and a second connection terminal, and a height of a top surface of the first connection terminal is higher than a height of a top surface of the second connection terminal.

9. The card socket device of claim 8, wherein the first connection terminal is a power supply terminal, and the second connection terminal is a data input/output terminal.

10. The card socket device of claim 8, wherein the one or more connection terminal portions include a flexible member having elasticity in a direction perpendicular to a bottom surface of the seat portion.

11. A card socket device comprising:
a seat portion configured to receive an attachable memory card, wherein the seat portion is configured such that a space accommodating the attachable memory card is open on two linear sides; and
one or more connection terminal portions formed in the seat portion and configured to form an electrical connection with one or more connection pads formed in a bottom surface of the attachable memory card, wherein the one or more connection terminal portions include a first connection terminal and a second connection terminal, and a height of a top surface of the first connection terminal is higher than a height of a top surface of the second connection terminal.

12. An electronic apparatus comprising:
a card socket device configured to receive an attachable card; and
an accommodating groove configured to accommodate the attachable card and the card socket device,
wherein the card socket device is configured such that a space accommodating the attachable card is upwardly opened, and at least a portion of an inner surface of the first accommodating groove has a shape corresponding to a sidewall of the attachable card so as to be engaged with the sidewall of the attachable card.

13. The electronic apparatus of claim 12, further comprising:
a second accommodating groove disposed under an end of the attachable card and having a bottom surface lower than a bottom surface of the first accommodating groove when the attachable care is inserted into the card socket device.

14. The electronic apparatus of claim 12, wherein the card socket device is configured to expose a top surface of the attachable card when the attachable card is mounted thereon and further including:
a fixing member disposed in an upper portion of an inner surface of the first accommodating groove to retain the attachable card.

15. The electronic apparatus of claim 12, further comprising:
a seat portion configured to receive an attachable card; and
one or more connection terminal portions formed in the seat portion and configured to form an electrical connection with one or more connection pads formed in a bottom surface of the attachable card, wherein the seat portion is configured such that a space accommodating the attachable card is upwardly opened.

16. The electronic apparatus of claim 15, wherein the seat portion includes a bottom portion which faces the bottom surface of the attachable card and on which the one or more connection terminal portions are formed, and one or more sidewall portions that face at least a portion of a side of the attachable card, and wherein an inner surface of the one or more sidewall portions has a shape corresponding to the side of the attachable card so as to be engaged with the side of the attachable card.

17. The electronic apparatus of claim 16, further comprising one or more fixing members disposed in an upper inner surface of the one or more sidewall portions to retain the attachable card.

18. The electronic apparatus of claim 17, further comprising:
 a visor configured to protrude from an upper inner surface of a portion of the one or more sidewall portions, which are adjacent to the one or more connection terminal portions, and to direct the attachable card to be inserted in a direction toward the connection terminal portion.

19. The electronic apparatus of claim 18, wherein when the attachable card is mounted on the seat portion, a height of a top surface of the sidewall portion is equal to or lower than a height of a top surface of the attachable card.

* * * * *